US011680523B2

(12) United States Patent
Jaerling et al.

(10) Patent No.: US 11,680,523 B2
(45) Date of Patent: Jun. 20, 2023

(54) GAS TURBINE ARRANGEMENT WITH CONTROLLED BLEED AIR INJECTION INTO COMBUSTOR, AND METHOD OF OPERATION

(71) Applicant: Siemens Energy Global GmbH & Co. KG, Munich (DE)

(72) Inventors: Patrik Jaerling, Linkoping (SE); Anders Larsson, Lotorp (SE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 904 days.

(21) Appl. No.: 16/326,454

(22) PCT Filed: Aug. 4, 2017

(86) PCT No.: PCT/EP2017/069763
§ 371 (c)(1),
(2) Date: Feb. 19, 2019

(87) PCT Pub. No.: WO2018/059804
PCT Pub. Date: Apr. 5, 2018

(65) Prior Publication Data
US 2021/0285371 A1    Sep. 16, 2021

(30) Foreign Application Priority Data
Sep. 30, 2016 (EP) ..................... 16191803

(51) Int. Cl.
*F02C 6/08* (2006.01)
*F02C 3/22* (2006.01)
(Continued)

(52) U.S. Cl.
CPC ............... *F02C 6/08* (2013.01); *F02C 3/22* (2013.01); *F02C 7/222* (2013.01); *F02C 9/40* (2013.01); *F05D 2220/75* (2013.01)

(58) Field of Classification Search
CPC ..... F02C 3/22; F02C 6/08; F02C 7/222; F02C 9/40
See application file for complete search history.

(56) References Cited

U.S. PATENT DOCUMENTS 8,340,886 B2 * 12/2012 Nenmeni ................. F02C 9/40
                                                    60/746
8,783,007 B2 *  7/2014 Mestroni .................. F02C 7/22
                                                    431/3

(Continued)

FOREIGN PATENT DOCUMENTS

| CH | 701628 A2 | 2/2011 |
| DE | 102014212826 A1 | 1/2016 |
| EP | 2546575 A2 | 1/2013 |

OTHER PUBLICATIONS

PCT International Search Report and Written Opinion of International Searching Authority dated Oct. 27, 2017 corresponding to PCT International Application No. PCT/EP2017/069763 filed Aug. 4, 2017.

*Primary Examiner* — Arun Goyal

(57) ABSTRACT

A gas turbine arrangement for dual fuel operation has a first manifold that delivers a first fuel or compressor bleed fluid and is connected to a bleed port and a first passage for ejecting fuel or fluid into a combustor space. A second manifold delivers a second fuel and is connected to a second passage for ejecting the second fuel into the combustor space. A control system, when operated with the second fuel, provides the second fuel to the second manifold and continuously opens the bleed valve to provide bleed fluid into the first manifold to replace the first fuel. The control system controls the bleed valve over time by throttling a mass flow of the bleed fluid provided to the first passage or by increasing a mass flow of the bleed fluid provided to the first passage to adapt to fuel properties of the second fuel.

18 Claims, 3 Drawing Sheets

(51) Int. Cl.
*F02C 7/22* (2006.01)
*F02C 9/40* (2006.01)

(56) References Cited

U.S. PATENT DOCUMENTS

| | | |
|---|---|---|
| 9,567,101 B2* | 2/2017 | Swann .................... B64D 45/00 |
| 9,909,509 B2* | 3/2018 | Davies ...................... F02C 9/28 |
| 2011/0040469 A1 | 2/2011 | Singh et al. |
| 2012/0192542 A1* | 8/2012 | Chillar ...................... F02C 9/40 |
| | | 60/39.463 |
| 2013/0074945 A1* | 3/2013 | Karaca ...................... F02C 9/40 |
| | | 137/154 |
| 2016/0177879 A1* | 6/2016 | Montagne ................. F23K 5/16 |
| | | 60/779 |

* cited by examiner

GAS TURBINE ARRANGEMENT WITH CONTROLLED BLEED AIR INJECTION INTO COMBUSTOR, AND METHOD OF OPERATION

CROSS REFERENCE TO RELATED APPLICATIONS

This application is the US National Stage of International Application No. PCT/EP2017/069763 filed Aug. 4, 2017, and claims the benefit thereof. The International Application claims the benefit of European Application No. EP16191803 filed Sep. 30, 2016. All of the applications are incorporated by reference herein in their entirety.

FIELD OF THE INVENTION

The invention relates to a gas turbine arrangement which can be operated with alternative fuel supply, such that the fuel distribution in a combustion chamber can be adapted in reference to the reactiveness of the supplied fuel. Furthermore the invention relates to a method of operation of such a gas turbine arrangement.

BACKGROUND OF THE INVENTION

In a gas turbine engine typically ambient air may be compressed by a compressor section and provided to a combustor in which the substantially ambient air will be mixed fuel, the mixture being combusted in a combustion chamber of the combustor, to provide a driving force for a subsequent turbine section—an expansion turbine—in which a hot fluid from the combustor will drive rotor blades of the turbine to drive again one or several shafts. One of the shafts is typically connected to rotor blades of the expansion turbine—turbine rotor blades—and also to rotor blades of the compressor section—compressor rotor blades—so that fluidic forces generated by the combustor and acting upon the turbine rotor blades result directly in revolution of that shaft and the connected compressor rotor blades, which lead to—due to interaction with guide vanes of the compressor and due to reduced cross sectional area of the fluidic path in the compressor—to compression of the ambient air.

As explained, compressed ambient air and fuel is provided to the combustor. Typically the compressed air is swirled—via a swirler or a swirl generator—and fuel is injected into the swirled air to provide a well mixed fluid. This air/fuel mixture is ignited and burned in a combustion chamber of the combustor. In gas turbine engines a continuous combustion takes place in which constantly an air/fuel mixture is provided and burned such that a stable flame is formed in the combustion chamber.

Different types of fuels have different combustion properties. Modern combustors of stationary gas turbine engines are designed to operate with different types of fuel and in a broad range of working modes. Even though a combustor may be designed for a specific fuel type, for example natural gas from a specific source of delivery, it may be possible to operate the combustor with different fuels. Nevertheless the risk for instable combustion or flashbacks may increase.

To allow operation of gas turbine engines with different fuels with different heating value and different reactiveness, a burner with a single set of fuel nozzles may not be sufficient, particularly considering demands in respect of emission and on the contrary stable combustion. When changing to a different fuel, manual replacement of the burner or of burner parts can be performed to adjust the configuration to the different heating value and the modified reactiveness of the provided fuel. Alternatively, different sets of fuel nozzles may be prepared in the burner, a first set for a first type of fuel—e.g. natural gas from a specific source—, a second set for another type of fuel—e.g. natural gas from another source with a different chemical composition.

Nevertheless, highly reactive fuels, e.g. being rich in hydrogen, ethane, propane or heavier hydrocarbons, may still be problematic, as the positions of the fuel nozzles may not be prepared for such fuels that have a strong different behaviour when provided to the burner.

Different gases as fuels usually have different physical properties from natural gas—e.g. propane has higher density, hydrogen has higher diffusivity and reactivity. Nevertheless good premixing is wanted for different gaseous or liquid fuels.

On the other hand, it may often be desirable—e.g. for reactive fuel like hydrogen—to reduce the mixing time or residence time (defined as time for the gas molecule to move from the injection point to the flame front). This results that there is less premixing and therefore locally there may be pockets with richer air/fuel mixtures and other regions also leaner air/fuel mixtures.

Using such highly reactive fuels, if the burner is not adjusted to these, can result in a change of flame position and may result in local rich regions in the fuel distribution profile within a combustion chamber.

This can be problematic for so called DLE systems (DLE: dry low emissions), because these reduce emissions by combusting a lean air/fuel mixture, which on the other increase the risk of instabilities in the combustion. In consequence the fuel nozzles are typically optimized for the fuel to be used and providing a highly reactive fuel will change conditions, e.g. resulting in unwanted flame propagation.

In consequence, highly reactive fuels may require a modified handling of the provided fuel within the combustion chamber.

It is an aim to provide a solution to extend the range of modes of operations of a combustor, particularly a DLE system, to a wide range of fuels, e.g. for supply of highly reactive fuels, and maintaining a stable combustion for the different fuels.

It has to be noted that as a general aim typically in gas turbine design it is aimed for lean combustion at full load with supply of as little fuel as possible, particularly to reduce the expenditure for fuel. Furthermore a commonly used fuel to be combusted is natural gas. The lean combustion may typically be configured and optimised for full load operation of natural gas.

SUMMARY OF THE INVENTION

The present invention seeks to provide a solution for combustion of highly reactive fuels.

This objective is achieved by the independent claims. The dependent claims describe advantageous developments and modifications of the invention.

In accordance with the invention there is provided a gas turbine arrangement for at least dual fuel operation, comprising a compressor—particularly a multi-stage compressor—, at least one combustor (advantageously a plurality of combustors), a plurality of fuel manifolds, each connected to each of the at least one combustor, and a control system. A first manifold of the plurality of fuel manifolds is configured to deliver either a, advantageously gaseous, first fuel or a compressor bleed fluid, the first manifold being connectable to a bleed port of the compressor via a bleed valve for delivering the compressor bleed fluid, wherein the first manifold is connected to at least one first passage of the at least one combustor for ejecting the first fuel or the compressor bleed fluid into a combustor space. A second manifold of the plurality of fuel manifolds is configured to deliver at least a, advantageously gaseous, second fuel, wherein the second manifold is connected to at least one second passage of the at least one combustor for ejecting the second fuel into the combustor space. The control system, when the combustor is operated solely with the second fuel, is configured to (a) provide the second fuel to the second manifold and to continuously open the bleed valve to provide compressor bleed fluid into the first manifold such that the first fuel in the first manifold is replaced by the compressor bleed fluid, (b) to monitor a flame behaviour and/or fuel distribution in the combustor space, and (c) to modify the flame behaviour and/or fuel distribution by controlling of the bleed valve over time by throttling a mass flow of the compressor bleed fluid provided to the at least one first passage or alternatively by increasing a mass flow of the compressor bleed fluid provided to the at least one first passage to adapt to fuel properties of the second fuel.

The first fuel may be natural gas. The second fuel may be a more or highly reactive fuel.

The bleed valve may be a valve located in a single line which is connected to the bleed port.

Advantageously the single line will branch off to a plurality of lines, advantageously one line per separately controllable fuel injectors. In that case the bleed valve may be located in a line connected to the first manifold.

In another alternative the bleed valve may be provided in a two-stage configuration with a single central bleed valve to define the overall amount of extracted bleed fluid and further fuel manifold individual bleed valves to define the individual amount of bleed fluid per manifold. The further fuel manifold individual bleed valves may be called in this document further bleed valves.

The bleed valve may be a valve that can be set to a plurality of different throughput diameters. In that case and in a two-stage configuration the further bleed valves can optionally be a simple components that fully open or fully close throughput of the respective lines.

Alternatively, the further bleed valves may be valves that can be set to a plurality of different throughput diameters. In that case and in a two-stage configuration the (central) bleed valves can optionally be a simple components that fully open or fully closes throughput of the line.

In a further alternative, all of the bleed valve and also the further bleed valves may be valves that can be set to a plurality of different throughput diameters.

Besides the bleed valves also fuel supply valves may be provided, each connected to an individual manifold. This will allow to specifically provide fuel to a specific manifold.

With the feature "ejecting the second fuel into the combustor space" it is also understood that the second fuel may be injected into a burner space, a premix space, or a passage leading to one of the mentioned spaces. Eventually the second fuel, mixed with air, will be guided—i.e. ejected—into the combustor space.

Combustor comprises typically one or several combustion chambers and a plurality of burners connected to the combustion chamber(s).

The invention is particularly advantageous if the bleed valve configuration is controlled for all of a plurality of burners and/or all of a plurality of combustors. This is possible as the control system is supposed to alter settings based on fuel properties of the provided second fuel, and the second fuel is provided to all burners and/or all combustors.

With "flame behaviour" at least a spatial distribution of the flame within the combustor space is defined, particularly evaluated over a time range. In the context of this invention very quick effects like flame pulsation is not in the focus and advantageously not considered under the term "flame behaviour".

In consequence, highly reactive fuels as the second fuel can be used by the same burner and with the same combustion chamber, which are configured primarily for natural gas, as different distribution of an air and fuel mixture within the combustion chamber can be achieved when operating with these highly reactive fuels.

For example, in case of highly reactive fuel supply, the amount air can be increased due to that air as compressor bleed fluid is provided into the first manifold and later ejected via nozzles, so that consequently more air is provided to the air to fuel ratio changes when operated with highly reactive fuel as the second fuel.

Furthermore ejecting air via nozzles supplied from the first manifold can create air jets having an effect on the fuel distribution of the second fuel and also the velocity of air and fuel mixture.

The invention may allow redirecting a fraction of the fluid travelling through the compressor—i.e. compressed air—advantageously taken from a compressor or a subsequent transition piece—in this case called compressor discharge or compressor bleed fluid—, particularly from a downstream sub section of the compressor, advantageously at the last stage or after the last stage of the compressor.

Typically, "bleed air" or "bleed fluid" produced by gas turbine engines is compressed air that is diverted or branched off from the main fluid path through the compressor or from a subsequent transition piece of such an engine so that the bleed air leaves the main fluid path. The principle may be called "bleeding". "Purge air" or "purge fluid" may be extracted in the same way, but the term is used to specify also the purpose, i.e. to purge or flush lines, passages, manifolds, or nozzles in the engine.

An existing purge system can be used, which exists to purge fuel lines or other lines in the engine. Alternatively an additional purge or bleed system can be added to extract the compressor bleed fluid and to provide this to the first manifold. In consequence, a main fraction of that compressor fluid—of elevated temperature—is provided from the transition piece or the compressor to the combustor via a main travel path. According to the invention, another fraction of the compressor fluid may be diverted so that it can be supplied to the first manifold, i.e. a manifold that primarily is present and configured to supply fuel, particularly gaseous fuel like natural gas.

The main fluid is typically ambient air that is provided from a gas turbine inlet to the compressor—particularly the main compressor section—, and further via the transition piece to the combustor.

The pressure of the compressor fluid when extracted and injected into the first manifold, is sufficiently high to purge the first manifold and to be exhausted via nozzles—the nozzles having the primary intention to exhaust fuel—into the combustion space.

Advantageously the mode of operation can be activated, deactivated and/or controlled via the mentioned valves.

Besides the previously mentioned mode of operation when the combustor is operated solely with the second fuel there may be a mode of operation in which the combustor is operated solely with the first fuel. In the latter mode, the first fuel may be only provided to the first manifold and the second manifold will be provided with compressor bleed fluid. Alternatively, the first fuel—for example natural gas—may be supplied to both the first manifold and the second manifold, so that a larger amount of fuel nozzles are provided with the natural gas. In other words, in that mode of operation the number of nozzles to be provided with fuel is different if operated solely with the second fuel. It is proposed for operation with highly reactive gas fuel (as second fuel) that a lesser number of fuel nozzles is provided with fuel than the operation with natural gas (as first fuel), which is less reactive.

Advantageously the compressor may be a multi-stage compressor, thus having several stages of rows of blades and rows of vanes. A first row of blades or a number of rows of blades—e.g. three, four, or five—could be variable guide vanes and could be adjusted in position based on the mode of operation. Furthermore, the variable guide vanes may be followed by a plurality of rows of fixed oriented blades, e.g. three, four, five, six, or seven rows.

The bleed valve and/or the further bleed valves and/or the fuel supply valves define the amount of bleed fluid and/or the amount of the first fuel and/or the amount of the second fuel. The valve(s) may have an open position, a close position, and a number of or continuous intermediate positions for throttling the through-flow. As previously said, the control system is particularly configured, when the combustor is operated solely with the second fuel, to control the bleed valve—and/or advantageously the further bleed valves and/or the fuel supply valves—over time by throttling or alternatively increasing a mass flow of the compressor bleed fluid provided to the at least one first passage. This allows to adapt to fuel properties—e.g. reactiveness of the fuel, heating value of the fuel—of the second fuel.

Throttling the mass flow can be a single step of reduction of the mass flow through the bleed valve or repetitive steps of reduction of the mass flow. Reduction means particularly to reduce an opening size of the bleed valve so that less fluid can pass.

Similarly, increasing the mass flow can be a single step of increasing of the mass flow through the bleed valve or a repetitive step of increasing of the mass flow. Increase means particularly to widen an opening of the bleed valve so that more fluid can pass.

The feature of "throttling or increasing" is not meant as to alternatingly throttle and increase the mass flow in a short time frame but to be a continuous or repetitive throttling to adjust for a given second fuel with a low reactiveness, and in another mode of operation, to continuously or repetitively increase the mass flow to adjust for a different given second fuel with high reactiveness. Thus, the control system configures, when a second fuel is provided from a different source with different fuel properties, the bleed fluid supply to the first manifold for a given second fuel. This is advantageously a one time configuration which defines a work point which later on does not need to be changed again.

Thus, the control system is configured to find a stable work point for the setting of the bleed valve.

The reactiveness of the second fuel may advantageously be constant as long as the fuel supply does not change.

Advantageously, after the throttling or increasing step(s), the bleed valve stay unchanged while the same second fuel is supplied with unchanged fuel properties.

The invention is directed to operate with two different fuels—different in composition and/or in heating value—as alternative main fuels. It is the goal to find a new work point of operation for the bleed fluid supply which, once determined, then can remain constant. Advantageously both fuels are gaseous fuels. The invention is particularly not directed to control a split of main and pilot fuel during operation, even though pilot fuel may be used additionally to the mentioned first and second fuel and control procedures may be available to control the pilot fuel supply. The invention is particularly also not directed to create temporary fluctuations in the bleed fluid supply to counteract temporary effects in the flame behaviour.

Thus, the first manifold may be configured to provide the first fuel as main fuel of the combustor—not as pilot fuel—to a first set of main fuel nozzles, and the second manifold is configured to provide at least the second fuel as an alternative main fuel of the combustor to a second set of main fuel nozzles. Advantageously the second manifold may additionally be configured to provide also the first fuel as a main fuel of the combustor when the combustor is operated solely with the first fuel. That means that for example when operated with natural gas, both mentioned manifolds may supply natural gas to its individual fuel nozzles, while, when operated with highly reactive fuel, only the second manifold may be supplied with this highly reactive fuel and the first manifold is purged by compressor bleed fluid. That means the control system may be configured, when the combustor is operated solely with the first fuel, to provide the first fuel to the first manifold and also to the second manifold.

Advantageously, the first set of main fuel nozzles may have different aperture size and/or may be positioned at different locations compared to the second set of main fuel nozzles. For example the first set of main fuel nozzles may be positioned at a first burner stage and the second set of main fuel nozzles may be provided at a second—typically downstream—burner stage.

The control system may be configured, for the monitoring of the flame behaviour and/or fuel distribution, to monitor an air to fuel ratio in the combustor space—i.e. in the combustion chamber and/or a premix space and/or a combustion pre-chamber—and/or an axial velocity of a premixed air and fuel mixture in the combustor space, wherein an axial direction is defined as a direction of a main expanse of the combustor space. Thermocouples, pressure sensors, and/or combustion dynamics control methods may be used to monitor the flame behaviour and/or the axial velocity of the mixture.

Furthermore the control system may be configured, for the control of the bleed valve and/or the further bleed valves and/or the fuel supply valves, to evaluate fuel properties of the second fuel and/or the first fuel. In an embodiment, the fuel properties of the second fuel may particularly be related to a heating value and/or the chemical composition of the second fuel and/or the first fuel. These fuel properties may be configured (i.e. prior to startup of the engine) or may be collected by on-line monitoring.

In an embodiment, a cooling device may be provided for cooling the compressor bleed fluid. The cooling device may be located in the compressor bleed fluid passages prior to injection into the manifolds. This cooling may be advantageous as a lower bleed fluid temperature—i.e. typically air temperature—reduces the risk of auto-ignition of the fuel and air mixture in the combustor space at positions upstream of the wanted location for the flame.

The cooling device may be controlled by the control system, to adjust the cooling of the compressor bleed fluid.

As already indicated, the combustor may be configured as a premix combustion system, in which fuel and air is thoroughly pre-mixed before it is ignited to a flame. In such premix combustion systems the flame is usually detached from walls of the combustor.

The invention may also be related to a control method of operation of a gas turbine arrangement as defined in the previous paragraphs.

The control system may be specific for each single combustor of the at least one combustor or may be control all combustors at the same time.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

The aspects defined above and further aspects of the present invention are apparent from the examples of embodiment to be described hereinafter and are explained with reference to the examples of embodiment.

BRIEF DESCRIPTION OF THE DRAWINGS

Embodiments of the invention will now be described, by way of example only, with reference to the accompanying drawings, of which.

The illustration in the drawing is schematic. It is noted that for similar or identical elements in different figures, the same reference signs will be used.

Some of the features and especially the advantages will be explained for an assembled and operating gas turbine, but obviously the features can be applied also to the single components of the gas turbine but may show the advantages only once assembled and during operation. But when explained by means of a gas turbine during operation none of the details should be limited to a gas turbine while in operation.

DETAILED DESCRIPTION OF THE INVENTION

Figure 1:
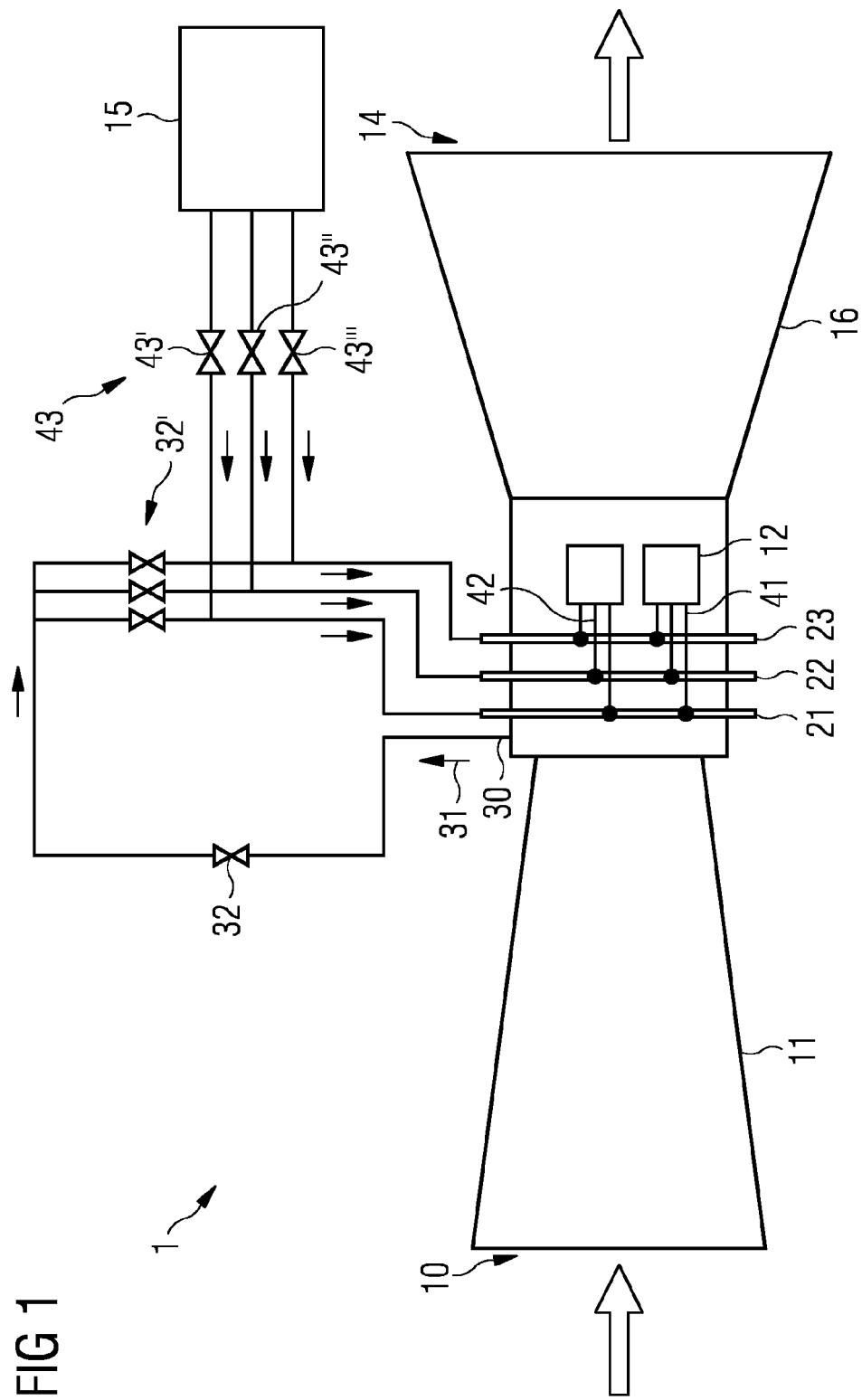
FIG. 1: shows schematically of an abstract configuration of an exemplary gas turbine arrangement.
Figure 2:
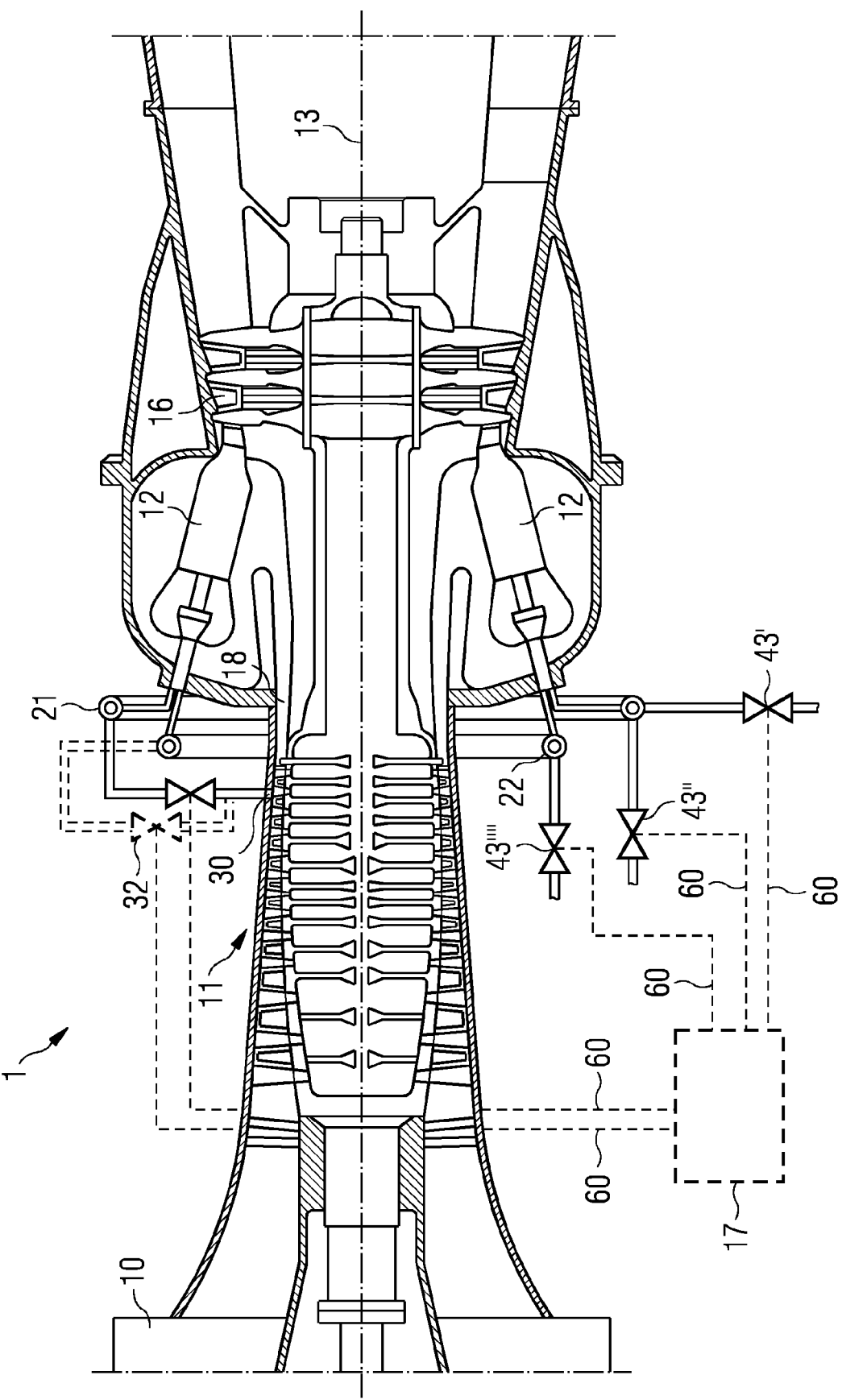
FIG. 2: shows a cross sectional but still simplified view of one embodiment of the gas turbine arrangement.

In reference to FIG. 1 and FIG. 2, it is briefly explained the principles of a gas turbine engine which comprises the features of a gas turbine arrangement 1 as introduced before.

In respect of operating a gas turbine engine, a gas turbine—short for gas-turbine engine—comprises an air inlet or intake 10 at one axial end followed by a compressor 11 in which incoming air (indicated in FIG. 1 by an arrow) is compressed for application to one or more combustors 12, which may be annular, so-called can-annular or of silo type, the can-annular type being distributed circumferentially around a turbine axis defining a rotational axis 13. Fuel is introduced into the combustors 12 and therein mixed with a major part of the compressed air taken from the compressor 11. Hot gases with high velocity as a consequence of combustion in the combustors 12 are directed to a set of turbine blades within a turbine section 16, being guided (i.e. redirected) by a set of guide vanes. The turbine blades and a shaft—the turbine blades being fixed to that shaft—form a part of the rotor and are rotated about the rotational axis 13 as a result of the impact of the flow of the hot gases. That rotating rotor (or in case of a plurality of rotors another connected rotor) also rotates blades of the compressor 11, so that the compressed air supply to the combustors 12 is generated by the rotor blades of the compressor 11 (i.e. by the used rotating blades interacting with static vanes) once in operation. There may be more than one rotor and/or more than one rotor shaft in the gas turbine engine. Past the turbine section 16, at a second axial end of the gas turbine and downstream of the turbine section 16, the combusted gas will be guided to an exhaust 14 of the gas turbine via which it will be released in to the ambient air or guided to a further component, like a steam boiler or a steam turbine. The exhausted gas may contain also combustion emissions, like CO.

In the following we will identify the ambient air that is guided from the air inlet, via the compressor 11 and to the combustor 12 as "compressor fluid", guided through the mentioned components via a main fluid path, which is an annular path via which the compressor fluid is delivered and in which the physical properties of the compressor fluid will be changed. The compressor fluid is delivered via the main fluid path to the combustor 12 for combustion with fuel.

Note that in the following a location of one component in relation to a second one is made in respect of a flow direction of a fluid, usually the compressor fluid or in other cases of fuel. The term "upstream" defines a position that the fluid passes earlier than the "downstream" position. That means an upstream end of a compressor is the section at which air enters the compressor from the inlet of the gas turbine. A downstream end defines the position at which the air is discharged from the compressor. The direction from an upstream end of the compressor to a downstream end of the compressor also is defined as (positive) axial direction. A direction perpendicular to a rotational axis of the gas turbine engine is called radial direction. Furthermore a direction given from a location on a cylindrical surface may comprise an axial vector component, a radial vector component and a circumferential vector component, all three components being perpendicular to another. Thus, a circumferential direction is the direction lateral to a cylindrical surface or lateral to an annular cavity.

FIG. 1 shows in an abstract way a bleed port 30 located at a downstream end of the compressor 11 or at a transition duct (identified in FIG. 2 via reference numeral 18) From the bleed port 30 compressor bleed fluid 31 is diverted from the main fluid path into a passage system, including several valves. A bleed valve 32 is present to close or open the bleed port 30 fluidically. In the exemplary configuration the shown gas turbine arrangement 1 the passage system expands to three lines with three further bleed valves 32', downstream of the bleed valve 32, allowing compressor bleed fluid 31 to be injected into a plurality of fuel manifolds, i.e. a first manifold 21, a second manifold 22, and a third manifold 23. A different number of manifolds may be present.

The same plurality of fuel manifolds are also connected to a fuel supply 15, which advantageously is configured to provide at least two different fuel types. Further fuel supply valves 43, i.e. a first fuel valve 43', a second fuel valve 43'', and a third fuel valve 43''' may be present and allow connection to the previously mentioned fuel manifolds 21, 22, 23.

The exemplary configuration should allow individual supply of fuel or air to the different manifolds. This can be achieved also by alternative configurations. Furthermore the valves are advantageously valves that can open and close the throughput, but are also able to throttle or to expand the throughput.

The three manifolds 21,22,23 are connected to each of the combustors 12. In FIG. 1 two combustors are shown as a pure example for explaining the invention.

Based on the basic setup of FIG. 1, a more detailed view is shown in FIG. 2 in respect of a control system 17 which is configured to control all the different valves.

In FIG. 2 the bleed port 30 is shown to divert from one of the last stages of the compressor 11. It is assumed that the pressure of the compressor bleed fluid 31 is sufficiently high to purge at least one of the fuel manifolds 21,22,23, depending on the mode of operation. In FIG. 2 two fuel manifolds 21 and 22 are shown. The first manifold 21 is connected to a first fuel valve 43' and a second fuel valve 43". The second manifold 22 is connected to a fourth fuel valve 43"". A first fuel—advantageously natural gas—can be provided via the first fuel valve 43' and via the fourth fuel valve 43"" to both manifolds 21 and 22.

Compressor bleed fluid as extracted from bleed port 30 can be provided via bleed valves 32—two bleed valves are indicated in FIG. 2, one per manifold—to both fuel manifolds 21,22. In this configuration one valve 32 is shown per manifold 21,22.

All these valves are configurable via control lines 60 from the control system 17.

In this example the control system 17 is configured to provide less reactive fuel to the first manifold 21 and also to the second manifold 22. Further the control system 17 is configured to provide higher reactive fuel to—only—the second manifold 22. In parallel, when both manifolds 21,22 are provided with fuel, the bleed valves 32 are closed by the control system 17. In case when only the second manifold 22 is provided with fuel, the bleed valves 32 will be set to provide compressor bleed fluid to—only—the first manifold 21, allowing to purge the first manifold 21.

Figure 3:
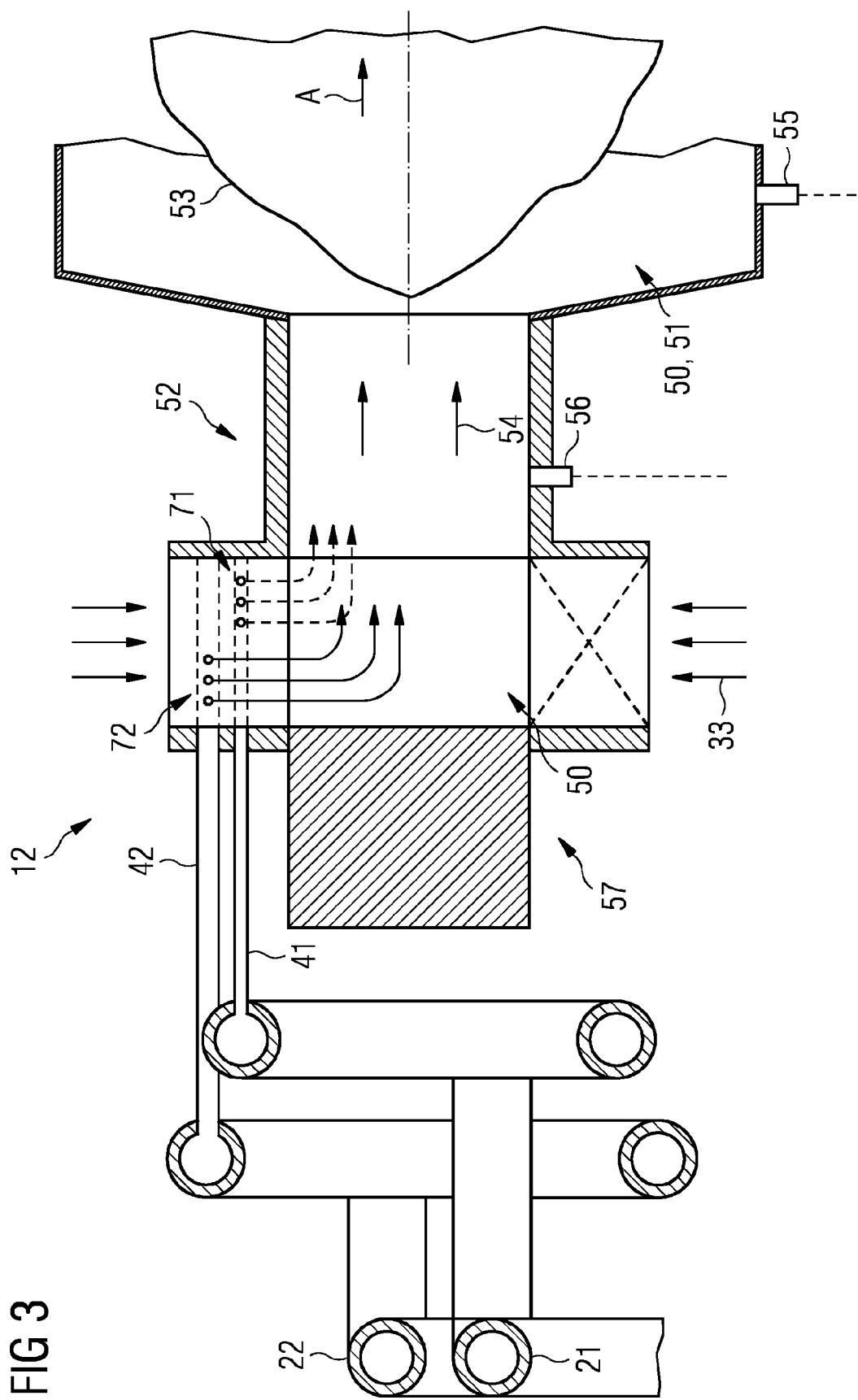
FIG. 3: shows an exemplary burner used within the gas turbine arrangement.

The advantages may not become apparent in FIG. 2 alone, but based on FIG. 2, a burner configuration is explained in more detail in relation to FIG. 3, so that also the advantages of this configuration should become apparent.

In FIG. 3 an exemplary combustor 12 is shown in a sectional view. This is only one combustor 12 of possibly a plurality of combustors. The combustor 12 may be substantially rotational symmetrical. A downstream direction within the combustor is indicated by an arrow for an axial direction A. Sections of the manifolds 21,22 are shown, which branch off to individual passages for supplying fuel nozzles within the combustor 12. The first manifold 21 is connected via a first passage 41 to a first set of main fuel nozzles 71. The second manifold 22 is connected via a second passage 42 to a second set of main fuel nozzles 72.

The fuel nozzles are located in the given example on a surface of a swirler vane of a swirler for mixing the provided fuel via the nozzles with compressor fluid 33, the latter entering swirler passages through the swirler. The swirler is part of a burner 57.

The combustor 12 comprises the burner 57 and a combustor space 50. The combustor space 50 starts upstream at the swirler passages, continues later via a premixing space 52 and ends in the combustion chamber 51.

A fuel and air mixture travels through the premixing space 52 until ignition in the combustion chamber 51. An exemplary flame front 53 is depicted as a pure fictitious example.

An axial velocity 54 of the fuel and air mixture through the premixing space 52 is shown as arrows in axial direction A.

As previously indicated in relation to FIG. 2, one mode of operation may be supply of natural gas (as the first fuel) via both of the manifolds 21,21, which results in provision of fuel via both the first set of main fuel nozzles 71 and the second set of main fuel nozzles 72.

In another mode of operation with a highly reactive fuel as the second fuel, the control system 17 is configured to only provide this second fuel via the second manifold 22 and in consequence only via the second set of main fuel nozzles 72. Furthermore, the bleed valve 32 (and/or one of the further bleed valves 32' if present) is opened so that the first manifold 21 is purged with air or compressor bleed fluid 31. In consequence this compressor bleed fluid 31 is exhausted via the first set of main fuel nozzles 71. This has the advantage that the fuel to air ratio is reduced when operated with the second fuel compared to operation with the first fuel. A second advantage occurs as air jets are exhausted through the first set of main fuel nozzles 71 which possibly increases mixing of fuel and air. As an advantage, the flame front 53 may substantially keep position and is not drawn into upstream direction within the premixing space 52.

The amount of air provided through the first set of fuel nozzles 71 may be above a threshold below which a fuel and air mixture would enter backwards into the first set of main fuel nozzles 71. The amount of air can be controlled by the control unit 17.

The control unit 17 is configured to monitor a flame behaviour and/or fuel distribution in the combustor space 50. The flame behaviour may be derived from data collected from at least one pressure sensor 55 and from at least one thermocouple sensor 56. Possibly a plurality of these sensors may be present around a circumference of the combustion space 50.

Based on the collected data all involved valves—particularly the bleed valve 32 (and the further bleed valves 32' if present)—may be controlled by the control unit 17. This allows modifying the flame behaviour and/or the fuel distribution within the combustion space 50.

The control is performed over time and over space. Changes of the flame behaviour and/or the fuel distribution over time can be detected and such that modifications in the fuel and air mixture can be initiated.

Uneven flame behaviour and/or fuel distribution in respect of its location—i.e. over space—can also be detected and possibly be improved by changing valve settings.

Advantageously combustion pressure dynamics are monitored, particularly by evaluating pressure sensor data. Additionally flashbacks—i.e. travel of the flame in negative axial direction for at least a short time—may be monitored, particularly comprising evaluating thermocouple sensor data.

Different configurations can be foreseen. The positions and numbers of the mentioned valves are purely exemplary. Valves may also be replaced by other components that have the effect of restricting a mass flow through passages.

The invention is particularly advantageous if two different gaseous fuels are used alternating in the same gas turbine arrangement. As a gas turbine engine is typically optimised for operation with one specific fuel type—typically natural gas—operation with a different fuel can be improved with the invention. Especially when the second fuel is a highly reactive fuel—the second fuel is rich of hydrogen, ethane, propane, and/or hydrocarbons heavier than ethane and propane, thus including butanes, pentanes, hexanes, etc.—this invention allows stable operation, as more air is provided to the combustor and the fuel and air mixture will have a different percentage than when operated with natural gas.

As a brief summary, the invention is advantageously directed to adapt to fuel properties of a provided fuel and to allow operating the combustor with a variety of different fuels without the need to replace burner parts manually. An amount of provided bleed or purge fluid is determined and selected permanently or enduringly based on the flame behaviour and/or fuel distribution for the provided fuel. While the provided fuel is provided via one fuel manifold and to corresponding fuel injectors, the bleed or purge air is provided to another fuel manifold and to related fuel injectors (which are purged then). So for highly reactive fuels the bleed or purge air may be increased permanently to create a leaner fuel and air mix. The flame position may change as well in the combustion space. This allows avoiding overly hot machine parts and unwanted flame behaviour.

The invention claimed is:

1. A gas turbine arrangement for at least dual fuel operation, comprising:
   a compressor;
   a bleed port formed in one of the compressor or a transition duct;
   a bleed valve in fluid connection with the bleed port;
   a plurality of combustors, each combustor of the plurality of combustors having a combustor space;
   a first manifold connected to the each combustor and the bleed valve;
   a second manifold connected to the each combustor and the bleed valve;
   a first further bleed valve connected to the bleed valve and the first manifold:
   a second further bleed valve connected to the bleed valve and the second manifold; and
   a control system;
   wherein the first manifold is configured to deliver either a first fuel or a compressor bleed fluid, the first manifold being connectable to the bleed port via a bleed valve for delivering the compressor bleed fluid to the each combustor, wherein the first manifold is connected to at least one first passage of the each combustor for ejecting the first fuel or the compressor bleed fluid into the combustor space;
   wherein the second manifold is configured to deliver a second fuel different from the first fuel, wherein the second manifold is connected to at least one second passage of the each combustor for ejecting the second fuel into the combustor space;
   wherein the control system, when the each combustor is operated solely with the second fuel, is configured
      to continuously open the bleed valve and the first further bleed valve to provide the compressor bleed fluid into the first manifold and to close the second further bleed valve to provide the second fuel into the second manifold
      to monitor a flame behaviour and/or a fuel distribution in the combustor space, and
      to modify the flame behaviour and/or the fuel distribution by controlling the bleed valve over time by throttling a mass flow of the compressor bleed fluid provided to the at least one first passage or alternatively by increasing a mass flow of the compressor bleed fluid provided to the at least one first passage.

2. The gas turbine arrangement according to claim 1, wherein the control system is configured, when the each combustor is operated solely with the second fuel, to control additionally the first further bleed valve and/or further fuel supply valves over time by throttling or alternatively increasing a mass flow of the compressor bleed fluid provided to the at least one first passage.

3. The gas turbine arrangement according to claim 2, wherein the control system is configured, for the monitoring of the flame behaviour and/or fuel distribution, to monitor an air to fuel ratio in the combustor space and/or an axial velocity of a premixed air and fuel mixture in the combustor space, wherein an axial direction is defined as a direction of a main expanse of the combustor space.

4. The gas turbine arrangement according to claim 1, wherein the control system is configured, for control of the bleed valve, to evaluate fuel properties of the second fuel.

5. The gas turbine arrangement according to claim 4, wherein the fuel properties of the second fuel are related to a heating value and/or a chemical composition of the second fuel.

6. The gas turbine arrangement according to claim 1, wherein the control system is configured, when the each combustor is operated solely with the first fuel, to provide the first fuel to the first manifold and to the second manifold.

7. The gas turbine arrangement according to claim 1, wherein the compressor bleed fluid is extracted from one of trailing stages of the compressor.

8. The gas turbine arrangement according to claim 7, wherein the compressor bleed fluid is extracted from a last stage of the compressor, or from a transition duct downstream of the last stage of the compressor.

9. The gas turbine arrangement according to claim 1, wherein the first manifold is configured to provide the first fuel as main fuel of the each combustor to a first set of main fuel nozzles, and wherein the second manifold is configured to provide at least the second fuel as an alternative main fuel of the each combustor to a second set of the main fuel nozzles.

10. The gas turbine arrangement according to claim 9, wherein the first set of the main fuel nozzles have different aperture size and/or are positioned at different locations compared to the second set of the main fuel nozzles.

11. The gas turbine arrangement according to claim 9, wherein the second manifold is configured to provide also the first fuel as a main fuel of the each combustor when the each combustor is operated solely with the first fuel.

12. The gas turbine arrangement according to claim 1, further comprising:
   a cooling device for cooling the compressor bleed fluid.

13. The gas turbine arrangement according to claim 12, wherein the cooling device is controlled by the control system, to adjust the cooling of the compressor bleed fluid.

14. The gas turbine arrangement according to claim 1, wherein the first fuel and/or the second fuel is gaseous.

15. A method to operate a gas turbine arrangement, the method comprising:
   operating a compressor to provide a compressor fluid;
   delivering the compressor fluid to a plurality of combustors, each combustor of the plurality of combustors having a combustor space;
   delivering a first fuel into a first manifold;
   delivering a second fuel different from the first fuel into a second manifold;

closing a second further bleed valve connected to a bleed valve to provide the second fuel to the second manifold when the each combustor is operated solely with the second fuel;

continuously opening the bleed valve and a first further bleed valve connected to the a bleed valve, to provide a portion of the compressor fluid through a bleed port formed in one of the compressor or a transition duct as a compressor bleed fluid into the first manifold;

monitoring a flame behaviour and/or a fuel distribution in the combustor space; and controlling the bleed valve over time by one of throttling a mass flow of the compressor bleed fluid provided to at least one first passage, and increasing a mass flow of the compressor bleed fluid provided to the at least one first passage to adapt to fuel properties of the second fuel for modifying the flame behaviour and/or the fuel distribution.

16. The method to operate a gas turbine arrangement according to claim 15, further comprising:
providing a high reactive fuel as the second fuel to the second manifold, the high reactive fuel being more reactive than the first fuel, or more reactive than natural gas.

17. The method to operate a gas turbine arrangement according to claim 16,
wherein the high reactive fuel is rich of hydrogen, ethane, propane, and/or hydrocarbons heavier than ethane and propane.

18. The method to operate a gas turbine arrangement according to claim 15, wherein the monitoring of the flame behaviour comprises:
monitoring of combustion pressure dynamics, and/or evaluating pressure sensor data, and/or
monitoring of flashbacks, and/or evaluating thermocouple sensor data.

* * * * *